May 14, 1929.  L. W. HASSENSALL  1,712,701

DEVICE FOR COOLING LIQUIDS

Filed April 20, 1928    2 Sheets-Sheet 1

Inventor
L. W. Hassensall

By
Lacey & Lacey, Attorneys

May 14, 1929. L. W. HASSENSALL 1,712,701
DEVICE FOR COOLING LIQUIDS
Filed April 20, 1928  2 Sheets-Sheet 2

Inventor
L. W. Hassensall

By Lacey & Lacey, Attorneys

Patented May 14, 1929.

1,712,701

UNITED STATES PATENT OFFICE.

LOUIS W. HASSENSALL, OF AIKEN, SOUTH CAROLINA.

DEVICE FOR COOLING LIQUIDS.

Application filed April 20, 1928. Serial No. 271,625.

This invention relates to refrigeration and more particularly to a device for cooling liquids, such as water, placed in a suitable receptacle.

One object of the invention is to provide an apparatus whereby frozen carbonic acid gas may be employed as a cooling medium and thereby eliminate the use of ice and also permit the water to be cooled by a medium capable of being stored in a small receptacle.

Another object of the invention is to cool the water by a medium which will serve not only as a cooling medium for the water but, if so desired, cause the water to be carbonated by disposing the outlet end of a pipe leading from the container below the level of water in the water receptacle.

Another object of the invention is to provide a device of this character in which a gas container may be easily removed when empty and replaced with a filled container.

Another object of the invention is to permit the cooling apparatus to be permanently connected with the water receptacle but at the same time allow the gas container forming part of the apparatus to be moved upwardly above the normal water level so that an empty container may be removed and a new one substituted without its being necessary for the person changing the containers to dip into the water in order to reach the container.

The invention is illustrated in the accompanying drawings, wherein.

Figure 1:
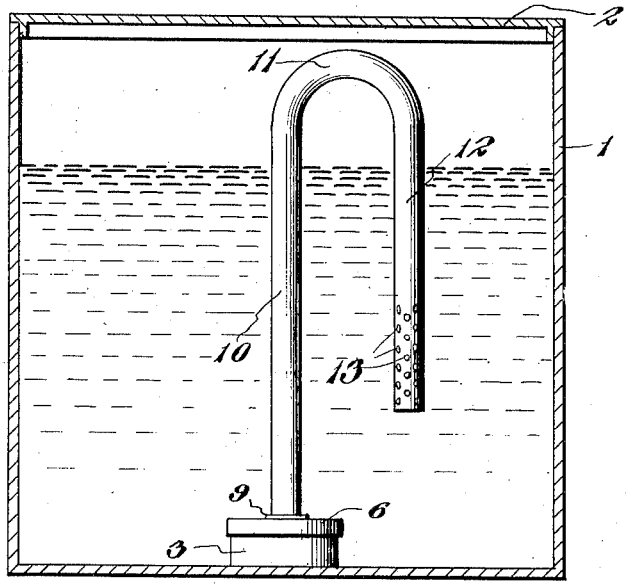
Figure 1 is a view showing a water receptacle in section and one form of the invention disposed in an operative position in the water receptacle.

The water receptacle or container 1 may be of any desired size and shape and is preferably provided with a cover 2 for its open upper end. The receptacle is normally filled with water to the level shown and this water may be removed in any desired manner or drawn out of the receptacle through a suitable outlet spigot. The receptacle or container 3 for the frozen carbonic acid gas will be of suitable size according to the capacity of the water cooler or receptacle 1 in which it is to be placed and the frozen gas 4 may be placed directly into the container or, if so desired, it may be stored in containers 5 at the place of manufacture, and these containers 5 fitted into the containers 3 by the person supplying the frozen gas to a user. It will be understood that if an inner container is employed it will have a cover 5' formed with one or more openings through which evaporating gas may escape. The removable cover 6 of the outer container fits tightly thereon and is provided with an outlet neck 7 which passes through an opening formed in the cover and at its inner end is formed with a flange 8. This stem 7 is externally threaded to receive a securing nut or disk 9, and it will be readily understood that, when the securing nut is screwed tightly into place, the neck will be firmly held in engagement with the cover. If so desired, the neck may be welded to the cover instead of being secured by the nut 9. It will be understood that the cover 6 has an air-tight fit upon the container or receptacle 3 and an air-tight joint will be provided between the neck and cover in any suitable manner. The frozen carbonic acid gas is of a snow-like consistency which may be molded into the desired shape to fit into and fill the container 3 and if it is desired to provide a quantity at one time which will last a relatively long length of time the frozen gas may be compressed into a solid mass in which state it resembles a cake of ice.

Figure 2:
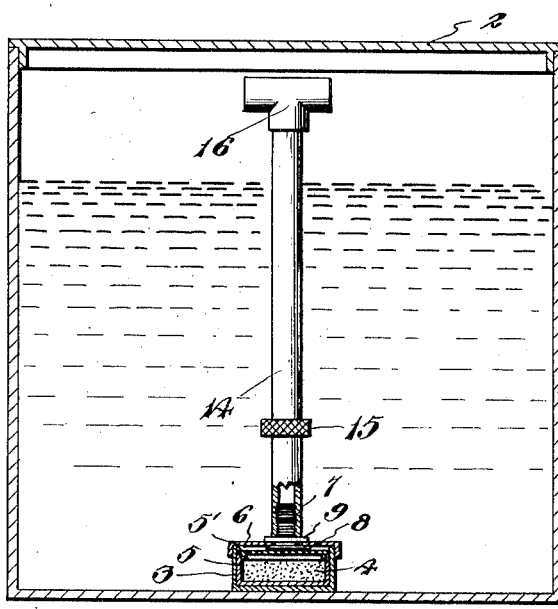
Fig. 2 is a similar view showing a modified form of the invention, the frozen gas container being shown in section.

In the form shown in Figs. 1 and 2, the gas receptacle or container rests upon the bottom of the cooler or water receptacle and the gas passes through a pipe disposed vertically in the water receptacle. In Fig. 1, the outlet pipe 10 consists of a metal tube which is threaded upon the neck 7 and extends upwardly above the normal water level of the water receptacle, the tube being then bent, as shown at 11, so that its free end portion 12 extends downwardly towards the bottom of the water receptacle. This free end portion extends downwardly into the water so that the gas when passing out of the pipe must move upwardly through the water and, if so desired, perforations 13 may be formed in the free end portion of the pipe so that the gas will escape in small bubbles instead of as a solid mass. By this arrangement the carbonic acid gas as it passes upwardly through the water will cause the water to be carbonated and very palatable.

In Fig. 2, the outlet pipe consists of a metal tube 14 which is straight throughout its length and of sufficient length to extend above the normal water level of the water receptacle. This tube carries a collar 15 so that it may be firmly grasped when it is to be screwed onto or off the neck 7 and at its upper end is provided with a T-shaped head 16 which is screwed upon the upper end of the pipe. When this form of outlet pipe is employed, the gas passes upwardly through it from the container and out through the ends of the head 16. The water will be cooled by the gas expanding in the outlet pipe but it will not be carbonated as the gas is not discharged from the pipe below the surface of the water.

When either of the embodiments shown in Figs. 1 and 2 is employed and it is necessary to replace an empty gas container with a filled one, the operator after removing the cover 2 from the water receptacle grasps the discharge pipe by the portion projecting upwardly above the water and lifts the pipe and container from the cooler. The empty container can then be unscrewed or otherwise released from its cover 6 and a filled container applied to the cover. It will, of course, be obvious that, if desired, the pipe may be unscrewed from the neck and a container having a cover applied to it at the place of storage substituted for the container and cover removed from the pipe. Threaded caps each having a relief opening in its top may be employed to seal the necks of the containers carried by the operator, and these caps will be removed before the neck of a filled container is screwed into a discharge pipe.

Figure 3:
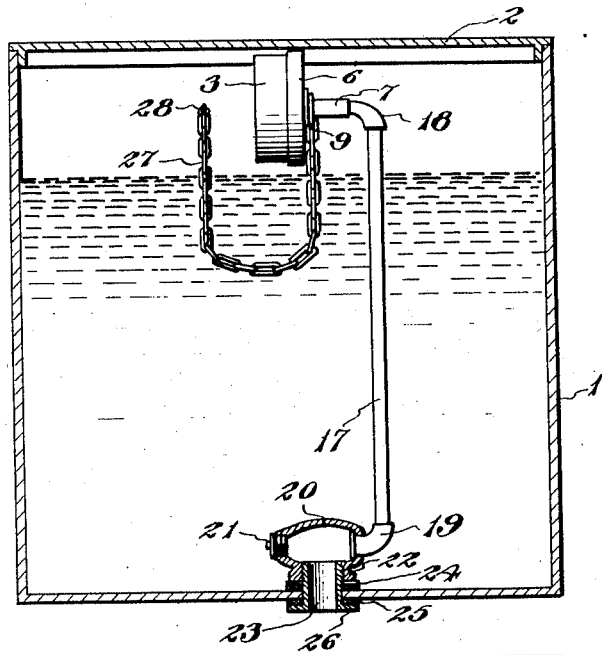
Fig. 3 is a view showing a water receptacle in section and cooling means associated therewith of the type permanently connected with the water receptacle.

In Fig. 3, the discharge pipe 17 also consists of a metal tube which is straight throughout its length and at one end the pipe carries an elbow 18 adapted to be screwed into the neck 7 and at its other end the tube is screwed into or otherwise suitably engaged with an elbow 19 loosely received in one end of a hollow terminal 20. This terminal 20 has its end opposite from the elbow 19 closed by a removable plug 21 and is formed with a side extension 22 having a threaded bore communicating with the interior of the shell. The threaded bore of the side arm 22 receives the threaded end of a hollow fastener 23 which is passed through an opening formed either in a side wall or the bottom of the water receptacle, and it will be readily understood that, when the fastener is screwed tightly into place with the washers 24 and 25 compressed between the side arm 22 and annular flange 26 of the fastener, the terminal will be securely held in place and water prevented from leaking through the opening in the water receptacle. Since the elbow 19 fits loosely in the terminal, the discharge pipe will be pivotally mounted for vertical movement and, therefore, when the chain 27 which is suspended from a hook 28 within the water cooler is drawn upon, the gas container may be drawn upwardly above the water in the cooler, as shown in Fig. 3, where it may be removed and a filled one substituted. After a filled container is set in place, it will sink to the bottom of the water cooler and as the gas passes from the container through the discharge pipe to the terminal and out through the hollow fastener the water in the cooler or water receptacle will be chilled.

Figure 4:
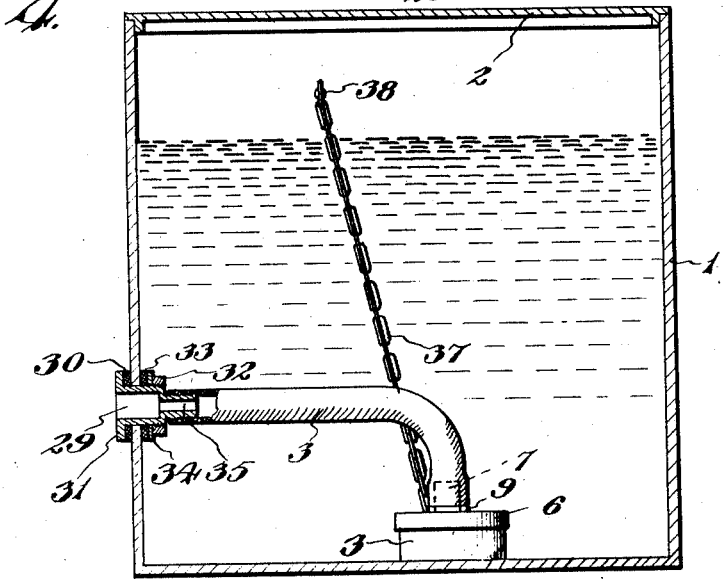
Fig. 4 is a view similar to Fig. 3 illustrating a modified form of water-cooling apparatus.

In Fig. 4, the hollow fastener which is indicated by the numeral 29 is passed through an opening in a side wall of the water receptacle with a washer 30 disposed between the wall of the receptacle and the collar 31 of the fastener and is held in place by a securing nut 32 screwed upon its inner end and bearing against washers 33 and 34 disposed about the fastener. A nipple 35 extends from the inner end of the hollow fastener and fits into one end portion of a discharge pipe 36. This discharge pipe is flexible and preferably formed of rubber although other materials may be substituted and has its other end portion fitted upon the neck 7 of the gas container where it may be held either by its frictional grip with the neck or through the medium of a suitable clamp disposed about it and tightened. When this form of the invention is employed, the gas container may be easily drawn upwardly by the chain 37 which corresponds to the chain 27 and is suspended from a hook 38 and after a filled container has been substituted for an empty one the chain released and the container allowed to sink to the bottom of the water cooler.

I have, therefore, provided a very convenient means whereby frozen carbonic acid gas may be employed as a cooling medium for drinking water. While it is stated that the gas is to be employed to chill drinking water, it will be understood that other liquids may be poured into the receptacle instead of water.

Having thus described the invention, I claim:

1. A cooling device to be disposed within a liquid container comprising a receptacle adapted to contain frozen gas, a cover for said receptacle, a tubular neck extending outwardly from said cover, and a pipe leading from said neck and constituting a discharge tube for gas passing from the receptacle.

2. A cooling device to be disposed within a liquid container comprising a receptacle adapted to contain frozen gas, said receptacle being open at its top and having a flat bottom whereby the receptacle may rest upon the bottom of the liquid container in an upright position, a cover for said receptacle removably engaged therewith and having a tubular neck constituting an outlet neck when the cover is applied to the receptacle, and a discharge pipe connected with said neck.

3. A cooling device to be disposed within a liquid container comprising a receptacle adapted to contain frozen gas, said receptacle being open at its top and having a flat bottom whereby the receptacle may rest upon the bottom of the liquid container in an upright position, a cover for said receptacle removably engaged therewith and having a tubular neck constituting an outlet neck when the cover is applied to the receptacle, and a discharge pipe connected with said neck and extending upwardly therefrom and of sufficient length to extend above the normal liquid level of the container.

4. A cooling device to be disposed within a liquid container comprising a receptacle adapted to contain frozen gas, said receptacle being open at its top and having a flat bottom whereby the receptacle may rest upon the bottom of the liquid container in an upright position, a cover for said receptacle removably engaged therewith and having a tubular neck constituting an outlet neck when the cover is applied to the receptacle, and a discharge pipe connected with said neck and extending upwardly therefrom a distance greater than the normal depth of liquid in the container and bent downwardly to extend below the level of water in the container.

5. A cooling device to be disposed within a liquid container comprising a receptacle adapted to contain frozen gas, said receptacle being open at its top and having a flat bottom whereby the receptacle may rest upon the bottom of the liquid container in an upright position, a cover for said receptacle removably engaged therewith and having a tubular neck constituting an outlet neck when the cover is applied to the receptacle, and a discharge pipe connected with said neck and extending upwardly therefrom a distance greater than the normal depth of liquid in the container and bent downwardly to provide a depending end portion terminating above the receptacle and having the walls of its lower end perforated.

6. A cooling device to be disposed within a liquid container comprising a receptacle adapted to contain frozen gas, a cover for said receptacle having an outlet, and a discharge pipe leading from the outlet of the cover.

7. A cooling device to be disposed within a liquid container comprising a receptacle adapted to contain frozen gas, said receptacle being open at its top and having a flat bottom whereby the receptacle may rest upon the bottom of the liquid container in an upright position, a cover for said receptacle having an outlet, and a discharge pipe extending upwardly from the outlet and of sufficient length to extend above the normal liquid level of the container.

8. A cooling device to be disposed within a liquid container comprising a receptacle adapted to contain frozen gas, said receptacle being open at its top and having a flat bottom whereby the receptacle may rest upon the bottom of the liquid container in an upright position, a cover for said receptacle removably engaged therewith and having an outlet, and a discharge pipe extending upwardly from the outlet a distance greater than the normal depth of liquid in the container and having its upper end portion extending transversely and then downwardly.

9. A cooling device to be disposed within a liquid container comprising a receptacle adapted to contain frozen gas, said receptacle being open at its top and having a flat bottom whereby the receptacle may rest upon the bottom of the liquid container in an upright position, a cover for said receptacle removably engaged therewith and having an outlet, and a discharge pipe extending upwardly from the outlet a distance greater than the normal depth of liquid in the container and bent downwardly to provide a depending end portion terminating above the receptacle and having the walls of its lower end perforated.

10. A liquid receptacle, a container for carbonic acid snow in said receptacle and entirely submerged in liquid, and a discharge pipe leading from said container and extending above the level of liquid in the receptacle.

11. A liquid receptacle, a container for carbonic acid snow in said receptacle and entirely submerged in liquid and bodily movable from a submerged position to a position above liquid in the receptacle for filling, and a discharge pipe leading from said container.

In testimony whereof I affix my signature.

LOUIS W. HASSENSALL. [L. S.]